March 5, 1963
R. E. PRICE
3,079,907
PROFILE DRESSER WITH FOLLOWER RIGIDLY
SUPPORTED IN ONE DIRECTION
Filed Dec. 16, 1960
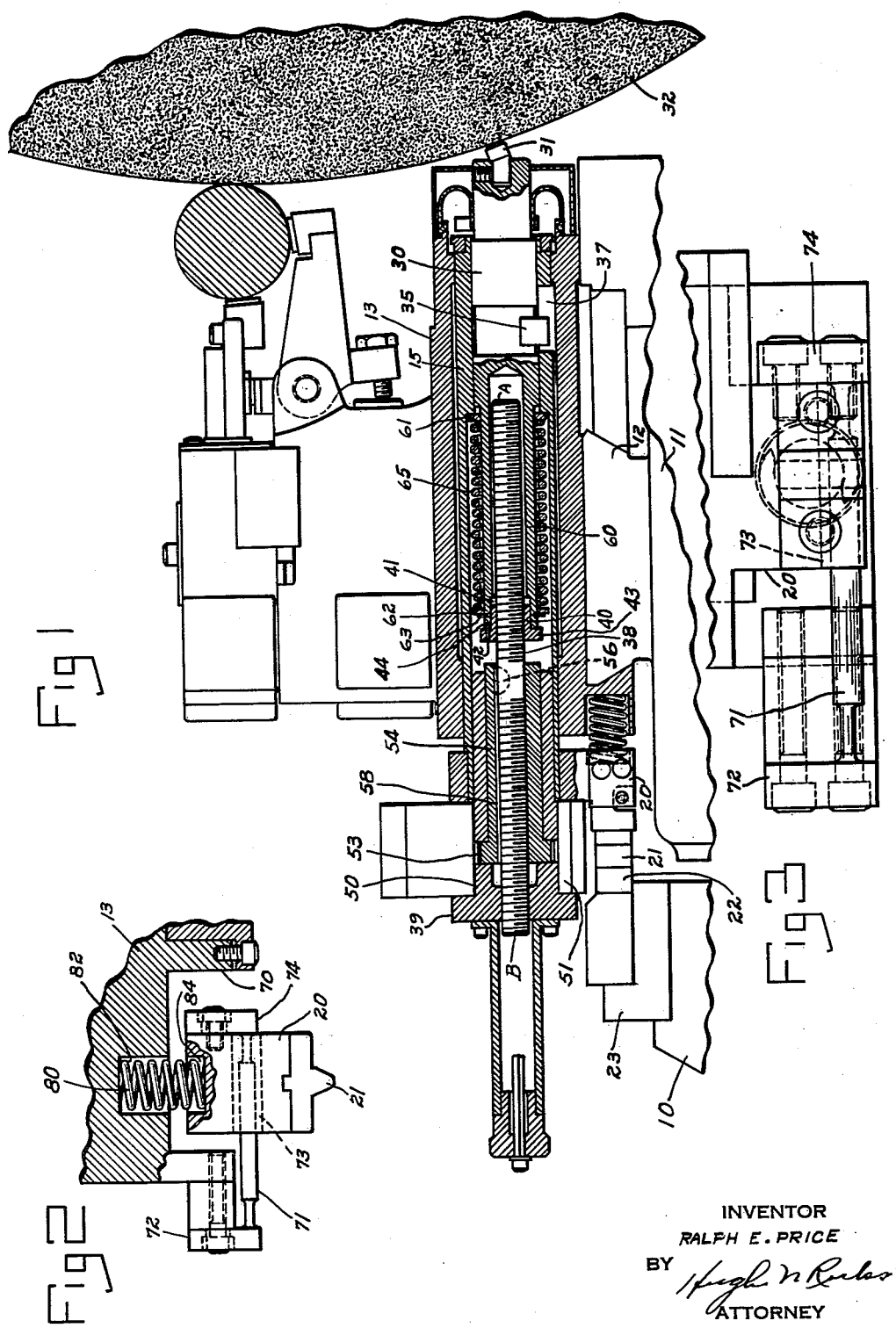
INVENTOR
RALPH E. PRICE
BY
ATTORNEY

United States Patent Office 3,079,907
Patented Mar. 5, 1963

3,079,907
PROFILE DRESSER WITH FOLLOWER RIGIDLY SUPPORTED IN ONE DIRECTION
Ralph E. Price, Waynesboro, Pa., assignor to Landis Tool Company, Waynesboro, Pa.
Filed Dec. 16, 1960, Ser. No. 76,243
5 Claims. (Cl. 125—11)

This invention relates to dressing devices for grinding wheels, particularly for grinding wheels having a formed or a non-cylindrical peripheral surface.

The means generally used for dressing a form on a grinding wheel consists of a follower on the movable portion of the dressing tool and a stationary profile bar having a surface corresponding to the surface to be formed on the grinding wheel. The follower is held in engagement with the profile bar by means of a spring acting on the dressing tool. In some cases, the arrangement of stationary and movable parts may be reversed. For the purpose of illustration, the movable dressing tool will be considered.

When such a tool is traversed across the grinding wheel, the follower travels across the profile bar and causes the tool to move toward and away from the grinding wheel in accordance with the form to be dressed on the wheel. As the follower moves along the profile bar, it is subjected to forces other than that required to move the dressing tool toward and away from the grinding wheel. These forces are transmitted through the follower to the dressing tool, generally in the form of a slight rotation of the tool holder and, therefore, of the dressing tool itself. Any such movement of a diamond during a dressing operation, changes the relation between the diamond and the grinding wheel so that it may dress a form sufficiently different from the form on the profile bar as to make the workpieces ground by the wheel unacceptable.

It is, therefore, an object of the present invention to provide a means for transmitting the form of a profile bar to a dressing tool to a grinding wheel while, at the same time, preventing the transmission to said dressing tool of other forces acting on the follower.

FIG. 1 is a right hand end view of the combined dresser and steady rest with the dresser shown in section.

FIG. 2 is a partial sectional plan view of the follower mounting.

FIG. 3 is a partial front elevation showing the follower mounting.

Numeral 10 indicates the bed of a grinding machine. Carriage 11 is slidably mounted on bed 10. Swivel table 12 is mounted for angular adjustment on carriage 11. Dresser housing 13 is attached to table 12. Inside housing 13, there is slidably mounted a sleeve 15. Sleeve 15 has a radially extending portion 20, the function of which will be described later.

Tool holder 30 is slidably mounted for limited endwise movement in sleeve 15. Dressing tool 31 is secured in the right hand end of tool holder 30. Stop member 35 is partially inserted in tool holder 30. Member 35 extends radially into an elongated slot 37 in sleeve 15. Slot 37 determines the extent of adjustment of tool holder 30 in sleeve 15.

The means for effecting axial adjustment of dressing tool 31 toward and from grinding wheel 32, comprises a differential adjusting screw 38 having a flanged member 40 threaded on the right hand end of threaded portion A and extending into bore 41 in the left end of tool holder 30. Pin 42 in the flanged portion 43 extends axially to the right to engage slot 44 in the end of tool holder 30. The purpose of pin 42 and slot 44 is to prevent rotation of member 40 with screw 38. The other end of screw 38 has a thread B of different pitch which co-acts with a threaded bore in cap member 39. Member 39 has a reduced portion 50 extending into housing 51. Ratchet 53 is formed on sleeve member 54 and is actuated by a piston operating pawl (not shown). An elongated key way 58 in sleeve member 54 co-acts with key 56 in screw 38.

Sleeve 15 is bored to two diameters, the smaller diameter to the right and the larger diameter to the left. The left end of tool holder 30 has a reduced portion 60. Washer 61 on reduced portion 60 of tool holder 30 extends radially into the larger diameter bore of sleeve 15. Spring 65 bears at the right hand end against washer 61 and the left hand end against washer 62 held in predetermined position on reduced portion 60 of tool holder 30 by snap ring 63. Spring 65 urges tool holder 30 to the left and through flanged member 40 to compensate for backlash between member 40 and the threads on portion A of screw 38. Spring 65, acting through member 40 and screw 38, also serves to take up backlash between thread portions B of screw 38 of member 39 into which it is threaded.

The radially or laterally extending portion 20 of sleeve 15 has attached thereto a follower member 21. Member 21 is adapted to engage profile bar 22 supported on bracket 23 on bed 10 of the grinding machine. Portion 20 is movably supported on flexible member 71 in an opening 70 in housing 13. The means for preventing forces resulting from the relative movement between profile bar 22 and follower 21 from being transmitted through portion 20 to sleeve 15 and tool holder 30, consists of flexible member 71 having an end portion 72 which is attached to housing 13. Member 71 extends through an opening 73 in portion 20. Opening 73 is wide enough not to interfere with the necessary movement of portion 20 as it follows the contour of profile bar 22. The other end of member 71 has a portion 74 which is attached to portion 20. Member 71 permits in and out movement of portion 20. Crosswise movement of portion 20 which would be transmitted to dressing tool 31 is prevented by the rigidity of member 71 in this direction.

While the movement of follower 21 on flexible member 71 is an arc, the variation from a straight line is negligible and member 71 has the effect of controlling follower 21 so that a minimum of lateral movement is transmitted to dressing tool 31.

Follower 21 is held in engagement with profile bar 22 by means of spring 80 supported in hole 82 in housing 13. Spring 80 extends into a similar hole 84 in portion 20.

I claim:

1. A dressing device for a grinding wheel comprising a housing, a dressing tool in said housing slidably mounted for movement transversely and longitudinally of said grinding wheel, a profile bar for guiding said dressing tool to provide a predetermined contour on said grinding wheel, a follower on said dressing tool, means for holding said follower against said profile bar, means for preventing uncontrolled movement of said follower and said dressing tool comprising an elongated guide member having one end attached to said follower, the other end being attached to said housing, said guide member being rigid in the direction of said longitudinal movement.

2. A dressing device for a grinding wheel comprising a housing movable axially of said grinding wheel, a sleeve slidably mounted in said housing, a tool holder adjustably mounted in said sleeve, said sleeve having a portion laterally extending through an opening in said housing, a profile bar, a follower carried by said laterally extending portion, means for holding said follower against said profile bar, and a guide member between said housing and said follower which is rigid in one direction and resilient in another direction to follow the form on said profile bar.

3. A dressing device for a grinding wheel comprising a housing movable axially of said grinding wheel, a sleeve slidably mounted in said housing, a tool holder adjustably mounted in said sleeve, said sleeve having a portion extending laterally through said housing, a profile bar, a follower carried by said laterally extending portion, means for holding said follower against said profile bar, and a guide member between said housing and said follower which is rigid in the direction of said axial movement and resilient in the sleeve of said profile bar.

4. A dressing tool for a grinding wheel comprising a housing movable axially of said grinding wheel, a sleeve slidably mounted in said housing, a tool holder adjustably mounted in said sleeve, said sleeve having a portion extending laterally through said housing, a profile bar, a follower carried by said laterally extending portion, means for holding said follower against said profile bar, and a guide member between said housing and said follower which is rigid in the direction of said axial movement of said follower and resilient in a direction transversely of said axial movement.

5. Mounting means for a grinding wheel dressing tool comprising a housing movable axially of the grinding wheel, a sleeve slidably mounted in said housing, a tool holder adjustably mounted in said sleeve, said sleeve having a depending portion, a profile bar, a follower carried by said depending portion, means for holding said follower against said profile bar, and means for holding said depending portion against movement by deflecting forces resulting from the relative movement between said follower and said profile bar, comprising a cantilever member having one end mounted in said housing, the other end in said follower.

References Cited in the file of this patent

UNITED STATES PATENTS

| | | |
|---|---|---|
| 1,031,726 | Mills et al. | July 9, 1912 |
| 1,772,345 | Flygare | Aug. 5, 1930 |
| 1,825,723 | Nenninger | Oct. 6, 1931 |

FOREIGN PATENTS

| | | |
|---|---|---|
| 646,857 | Germany | June 22, 1937 |